(12) United States Patent
Frank et al.

(10) Patent No.: US 8,625,473 B2
(45) Date of Patent: Jan. 7, 2014

(54) METHOD FOR FORMING AN AD HOC NETWORK

(75) Inventors: Michael Frank, Munich (DE); Ralf Rieken, Reston, VA (US)

(73) Assignee: Siemens Aktiengesellschaft, Munich (DE)

( * ) Notice: Subject to any disclaimer, the term of this patent is extended or adjusted under 35 U.S.C. 154(b) by 2076 days.

(21) Appl. No.: 10/210,869

(22) Filed: Aug. 2, 2002

(65) Prior Publication Data

US 2003/0026213 A1 Feb. 6, 2003

(30) Foreign Application Priority Data

Aug. 3, 2001 (DE) .................................. 101 382 66

(51) Int. Cl.
*H04B 1/44* (2006.01)
(52) U.S. Cl.
USPC ............ 370/282; 370/389; 370/401; 370/466
(58) Field of Classification Search
CPC ...................... H04L 29/08648; H04L 29/0809; H04L 29/08072; H04L 29/08666; G06F 9/465
USPC ......... 370/254, 338, 389, 466, 255, 282, 401; 709/203; 707/10
See application file for complete search history.

(56) References Cited

U.S. PATENT DOCUMENTS

| | | | |
|---|---|---|---|
| 5,555,376 A | | 9/1996 | Theimer et al. |
| 6,430,599 B1 * | | 8/2002 | Baker et al. ................... 709/203 |
| 6,604,127 B2 * | | 8/2003 | Murphy et al. ............... 709/203 |
| 6,886,017 B1 * | | 4/2005 | Jackson et al. ............. 707/104.1 |
| 6,993,570 B1 * | | 1/2006 | Irani .............................. 709/218 |
| 2002/0002627 A1 * | | 1/2002 | Stead et al. ................... 709/250 |
| 2002/0029277 A1 * | | 3/2002 | Simpson-Young et al. .. 709/228 |
| 2002/0055924 A1 * | | 5/2002 | Liming ........................ 707/100 |
| 2002/0116637 A1 * | | 8/2002 | Deitsch et al. ................ 713/201 |
| 2002/0193846 A1 * | | 12/2002 | Pool et al. ........................ 607/60 |
| 2003/0120776 A1 * | | 6/2003 | Avvari et al. .................. 709/225 |
| 2004/0205734 A1 * | | 10/2004 | Srinivasan et al. ............ 717/140 |

FOREIGN PATENT DOCUMENTS

| | | |
|---|---|---|
| DE | 10000943 A1 | 8/2001 |
| EP | 800 320 | 10/1997 |
| EP | 1 102 500 | 5/2001 |
| EP | 1 117 036 | 7/2001 |
| EP | 1117036 A2 | 7/2001 |
| WO | 96/36193 | 11/1996 |
| WO | 98/19479 | 5/1998 |
| WO | 01/01711 | 1/2001 |
| WO | 01/48977 | 7/2001 |
| WO | 01/76154 | 10/2001 |

OTHER PUBLICATIONS

J. Pärkkä, "A Wireless Wellness Monitor for Personal Weight Management", IEEE 2000, 0-7803-6449-X/00, pp. 83-88.

(Continued)

*Primary Examiner* — Jung Park
(74) *Attorney, Agent, or Firm* — Staas & Halsey LLP

(57) ABSTRACT

An ad hoc network is formed as a connection between a local area network with its services and at least one body-worn network when at least one computer in the local area network detects the local services located in the local area network, translates them into Jini services and offers them on the IP plane with the use of Jini middleware for body-worn networks.

22 Claims, 1 Drawing Sheet

(56) References Cited

OTHER PUBLICATIONS

Sun Microsystems Inc. "Jini™ Architectural Overview", Technical White Paper, 1999, pp. 12-20.
Claudia Piedmont: "Geistreiche Verbindungen Intelligente Geräte in dezentralen Netzen", c't 20/1998, paes 198-202.
Alan Kaminsky, "JiniME: JiniTM Connection Technology for Mobile Devices", Aug. 3, 2000, p. 1-26.
W. Kastner et al., "Improved Fieldbus Control Via Middleware Technology", Oct. 31, 2000, p. 604-609.
Gerd Aschemann et al., "A Jini-based Gateway Architecture for Mobile Devices", Sep. 20, 1999, p. 1-10.
Erik Guttman et al., "Automatic Discovery of Thin Servers: SLP, Jini and the SLP-Jini Bridge", 1999, p. 722-727.
Gerd Aschemann et al., "A Framework for the Integration of Legacy Devices into a Jini Management Federation", Oct. 11, 1999, p. 257-268.
K. F. Eustice et al., "A Universal Information Appliance", 1999, p. 575-601.
"Bluetooth Specification Version 1.0 B", Dec. 1, 1999, p. 62-93.

\* cited by examiner

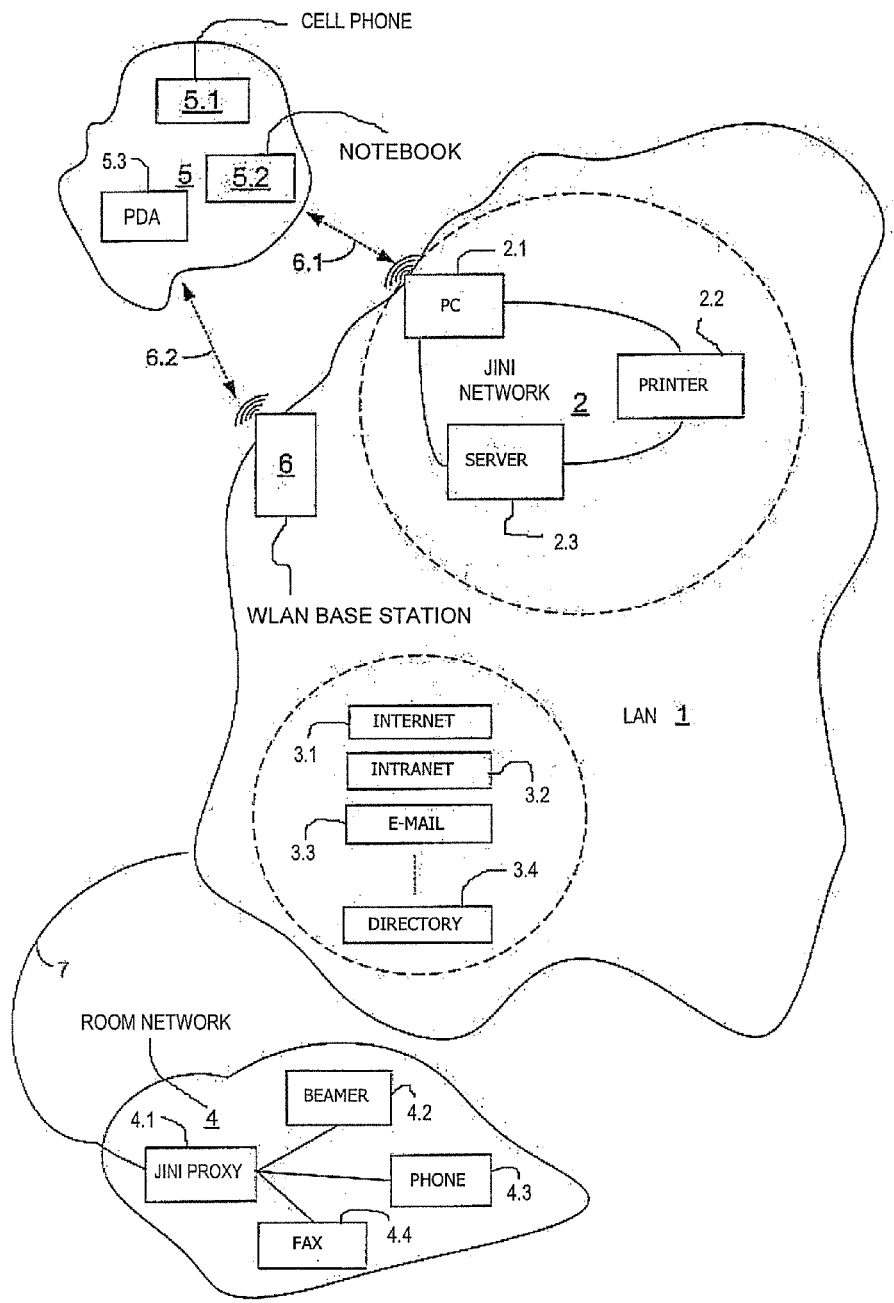

METHOD FOR FORMING AN AD HOC NETWORK

CROSS REFERENCE TO RELATED APPLICATIONS

This application is based on and hereby claims priority to German Application No. 101 382 66.9 filed on Aug. 3, 2001, the contents of which are hereby incorporated by reference.

BACKGROUND OF THE INVENTION

1. Field of the Invention

The invention relates to a method for forming an ad hoc network as a connection between a local area network with its services and at least one body-worn network.

2. Description of the Related Art

It is known that networks are currently administered centrally as a rule. If a new network element is added, it must be ensured that it "understands" the network elements already present, that is to say has the correct interface with the network and the correct drivers. One step in the development of the networks is therefore the development of the so-called "plug & play" in the form of the so-called "ad hoc" networks. A description of this novel network type, which will certainly gain in importance in the future, is to be found, for example, in the article entitled "Geistreiche Verbindungen, Intelligente Geräte in dezentralen Netzen" which can be translated "Brilliant connections, intelligent devices in decentralized networks". A specific design of an ad hoc network is the Jini™, whose architecture and mechanisms are described in the Technical White Paper "Jini™ Architectural Overview" from Sun Microsystems. The disclosure content of this publication, in particular with reference to the configuration of the Jini™ middleware, is hereby taken over into the disclosure content of this application.

Ad hoc networks such as that from Jini™ are distinguished in that network elements, and thus also the services offered by them, can be inserted arbitrarily into a network and removed again therefrom.

Here, services are understood in general terms as an entity which can be used by a person, a program, or another service. This can be hardware, software, filters, a communications channel, storage space and much else besides. Many individual services may be required to carry out a job.

The central control is undertaken by so-called blackboards. Network elements can communicate their existence and their capabilities to the blackboard and search for services that can offer capabilities. A leasing mechanism is offered for using the services, a use duration being agreed here between the participating entities upon the expiry of which the resources of the service being used are released again. The communication between services can be performed by Java Remote Method Invocation.

The problem of the prior art now consists in incorporating the Jini™ technology into the complex of a local area network, and thus creating an ad hoc network that permits the appliances incorporated via Jini™ also to access existing infrastructure rationally.

SUMMARY OF THE INVENTION

It is therefore an object of the invention to solve this problem of the prior art and to incorporate the Jini™ technology into the complex of a local area network and thereby to create an ad hoc network that permits the appliances incorporated via Jini™ also to access existing infrastructure rationally.

During ad hoc networking, that is to say the formation of ad hoc networks and the operation of these networks, the interplay of existing infrastructures with the body-worn networks, on the one hand, and room-specific infrastructures, on the other hand, with the aid of simple plug-and-play is made possible. The existing infrastructures include, for example, local area networks that enable in a corporate division or else in the area of public buildings services such as printing, access to e-mail servers, access to the Internet or Intranet, or else access to directories and information data sets, such as a so-called corporate directory or similar services.

Body-worn network is to be understood here to include all electronic appliances worn "on the person" such as, for example, a cell phone, a notebook, a digital camera, an organizer or a PDA etc.

A spatial network is defined with the aid of all room-specific appliances such as, for example, a fax machine present there, a beamer, a telephone or else access to a room-specific lighting system, an audio/video system or building automation techniques such as air conditioning, window shading etc.

An aspect of the present invention is that coworkers belonging and not belonging to a corporation, for example, can meet to confer in a corporate division and in the process can use their own appliances, connected to the in-house and out-of-house infrastructure, and the appliances located in the room. Thus, for example, it is to be possible to print a document that is located on a notebook brought in, to dial a telephone number on the cell phone via the corporate directory, to print out on the nearest printer a fax received on the cell phone or an e-mail attachment. Correspondingly, the aim is also to have available an e-mail service, access to the Internet and Intranet on the notebooks brought in and, over and above this, also to be able to jointly process documents on the notebooks brought in and to make a presentation on the beamer located in the room. Likewise, it is to be possible for out-of-house coworkers also to be able to set up online access to the Intranet of the out-of-house corporation.

Such services are currently possible only by way of problematic and individual incorporation of such appliances into a network structure, making use of driver software and knowledge on type and location of the available services or administrations with the aid of access rights.

According to the invention, a method for forming an ad hoc network as a connection between a local area network with its services and a body-worn network is improved to the effect that at least one computer in the local area network detects the local services located in the local area network, translates them into Jini™ services and offers them on the internet protocol (IP) plane with the use of Jini™ middleware for body-worn networks.

It can be advantageous in this case when the at least one computer, which translates the Jini™ services, serves as server in the local area network. However, it is also possible that the at least one computer is a client node of the local area network, or a base station of a room network.

In addition, the connection between the at least one computer, which translates the Jini™ services, and the body-worn network is produced in a wireless fashion or with galvanic coupling, or both, the aim being to give preference to the wireless connection via infrared interfaces, Bluetooth interfaces or similar systems, for example.

If the local area network is a network of large spatial extent, it can be advantageous for the services offered in the local area network to be assigned location-dependent attributes such that it is possible on the basis of the location-dependent attributes present to communicate the spatial structure of the offered services to the respective appliance in the region of a body-worn network such that, if appropriate, it is possible in the case of a multiplicity of similar services to access specifically the services nearest in location, for example the services of the room in which a person is located.

For this purpose an appliance that belongs to a body-worn network and is connected to the local area network is assigned the same location-dependent attribute as the computer of the local area network via which the connection to the body-worn network is set up. Owing to this assignment of the location-dependent attributes, it is now possible on the basis of the defined localization of the services and appliances located in the overall ad hoc network for such services and appliances to be connected to one another in a practically and spatially rational way.

Thus, for example, it is now possible to use a PDA to access specifically the building automation in order to regulate the temperature or the lighting in the room in which one is currently located. At the same time, it is also possible in a countermove to use the local area network to locate coworkers in the corporate division, or other persons, since the location attribute of the respective person is present in the local area network, for example via his/her cell phone. It can be particularly advantageous for this purpose when the location-dependent attributes are selected in a room-specific fashion such that it is possible to specify the room in a simple way when giving the location.

An additional advantageous development of the method resides in the fact that given the presence of a plurality of similar services in the local area network the services nearest in location are offered respectively as a matter of priority or exclusively to each appliance located in a body-worn network. Thus, for example, it is possible to take account of the structure of a building with its stories and departments. This renders it substantially easier for the subscriber in the ad hoc network to find the services favorably located for him.

It is advantageous in this case when the location-dependent attributes are defined hierarchically in accordance with their location-dependent possibility of use.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a block diagram of an ad hoc network according to the invention.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

As illustrated in FIG. 1, an ad hoc network according to the invention includes a local area network 1, a room network 4 connected to local area network 1 via an Ethernet line 7, and a body-worn network 5. The body-worn network 5 has a cell phone 5.1, a notebook 5.2 and PDA 5.3, which communicate via a WLAN base station 6, which is located in the LAN 1.

On the other hand, it is also possible to communicate with a Jini™ network 2 integrated in the LAN 1 and in which there is located, for example, a coworker's PC 2.1, a printer 2.2 and a department server 2.3 that constitute in their totality a subgroup of the LAN 1.

Also located in the LAN 1 are global Jini™ services 3 such as, for example, an access to the Internet 3.1, an access to the Intranet 3.2, an e-mail service 3.3 or a corporate directory 3.n. Of course, this enumeration is not exhaustive.

The connecting structures within the local area network 1 are deliberately kept open, since in this way it is possible to apply all known possible networks. The link-up, illustrated by way of example, via an Ethernet 7 of the room network 4 is likewise not intended to limit the invention. Located here by way of example in the room network 4 illustrated is a Jini™ proxy 4.1 via which a beamer 4.2, a telephone 4.3 and a fax machine 4.4, which are all located inside a room, are connected.

It is now possible by this design of an ad hoc network according to the invention for a person having a body-worn network composed of individual electronic appliances to enter the region of a local area network of a corporation and immediately to be able to use all possibilities open to him of the services present in this local area network.

In addition, it is to be pointed out in this case that the term "corporate division" is to be understood not only as a corporation in the business sense, but also, for example, the term "corporation" is also to be understood as an airport, a railroad station, local area networks of a ship, of an aircraft or of a train, or other local structures such as public buildings or else entire exposition grounds and even the district of a town or city.

It goes without saying that the above-named features of the invention can be used not, only in the combination respectively specified, but also in other combinations or alone, without leaving the scope of the invention. The invention has been described in detail with particular reference to preferred embodiments thereof and examples, but it will be understood that variations and modifications can be effected within the spirit and scope of the invention.

What is claimed is:

1. A method for providing Jini services in a local area network, comprising:
assigning a location-dependent attribute to at least one computer in the local area network;
detecting, by the at least one computer, local services of the local area network that are not Jini services;
translating, by the at least one computer, the detected local services into Jini services;
assigning, by the at least one computer, the location-dependent attribute to the translated Jini services;
offering, by the at least one computer, the translated Jini services in the local area network.

2. The method as claimed in claim 1, wherein the at least one computer is a server in the local area network.

3. The method as claimed in claim 1, wherein the at least one computer is a client of the local area network.

4. The method as claimed in claim 1, wherein the at least one computer is a base station of a room network.

5. The method as claimed in claim 1,
further comprising assigning an appliance connected to the local area network the location-dependent attribute of the at least one computer.

6. The method as claimed in claim 5, further comprising selecting the location-dependent attribute in a room-specific fashion.

7. The method as claimed in claim 1, further comprising, when similar services are available in the local area network, offering at least one service nearest in location to an appliance in the local area network, based on at least one of priority and exclusively per appliance.

8. The method as claimed in claim 7, wherein the location-dependent attribute is defined hierarchically in accordance with location-dependent possibility of use.

9. The method as claimed in claim 1, wherein the at least one computer is adapted for:
   assigning an access computer via which an appliance can be connected to the local area network a location-dependent attribute; and
   assigning an appliance belonging to a body-worn network and connected to the local area network via said access computer the same location-dependent attribute as that of the access computer.

10. A system for forming an ad hoc network as a connection between a local area network providing local services and at least one body-worn network, comprising:
    at least one computer in the local area network, the least one computer being assigned a location-dependent attribute and being configured to detect the local services of the local area network that are not Jini services, to translate the detected local services into Jini services, to assign the translated services the location-dependent attribute, and to offer the translated services as Jini services in the local area network; and
    at least one appliance of the at least one body-worn network that is connected to the local area network and uses the Jini services offered by the at least one computer.

11. The system as claimed in claim 10, wherein said at least one computer is a server in the local area network.

12. The system as claimed in claim 10, wherein said at least one computer is a client of the local area network.

13. The system as claimed in claim 10, wherein said at least one computer is a base station of a room network.

14. The system as claimed in claim 10, further comprising at least one of a wireless and galvanic coupling between said at least one computer and the at least one body-worn network.

15. The system as claimed in claim 10, wherein said at least one computer further selects the location-dependent attribute in a room-specific fashion.

16. The system as claimed in claim 10,
    wherein, when similar services are available in the local area network, said at least one computer further offers at least one service nearest in location to the at least one appliance, based on at least one of priority and exclusively per appliance.

17. The system as claimed in claim 16, wherein said at least one computer further assigns the services offered in the local area network, location-dependent attributes defined hierarchically in accordance with location-dependent possibility of use.

18. A computer in a local area network, comprising:
    an assigned location-dependent attribute;
    a detector configured to detect local services of the local area network that are not Jini services;
    a translator to translate the detected local services into Jini services;
    an assignor to assign the translated Jini services the location-dependent attribute; and
    a unit to offer the translated Jini services in the local area network.

19. The computer as claimed in claim 18, further comprising:
    a unit to assign an access computer, via which an appliance can be connected to the local area network, a location-dependent attribute; and
    a unit to assign an appliance belonging to a body-worn network and connected to the local area network via said access computer the same location-dependent attribute as that of the access computer.

20. The computer as claimed in claim 18, wherein the computer is a server in the local area network.

21. The computer as claimed in claim 18, wherein the computer is a client of the local area network.

22. The computer as claimed in claim 18, wherein the computer is a base station of a room network.

* * * * *